(12) United States Patent
Mirzazad Barijough et al.

(10) Patent No.: US 11,095,535 B2
(45) Date of Patent: Aug. 17, 2021

(54) ADAPTIVE AND FLEXIBLE PACKET SAMPLING

(71) Applicant: Gigamon Inc., Santa Clara, CA (US)

(72) Inventors: Maziar Mirzazad Barijough, Santa Cruz, CA (US); Santosh Reddy Mamidi, Fremont, CA (US)

(73) Assignee: Gigamon Inc., Santa Clara, CA (US)

( * ) Notice: Subject to any disclaimer, the term of this patent is extended or adjusted under 35 U.S.C. 154(b) by 396 days.

(21) Appl. No.: 15/848,465

(22) Filed: Dec. 20, 2017

(65) Prior Publication Data

US 2019/0058641 A1 Feb. 21, 2019

Related U.S. Application Data

(60) Provisional application No. 62/545,913, filed on Aug. 15, 2017.

(51) Int. Cl.
| | |
|---|---|
| *H04L 12/26* | (2006.01) |
| *H04L 12/825* | (2013.01) |
| *H04L 12/823* | (2013.01) |

(52) U.S. Cl.
CPC .......... *H04L 43/024* (2013.01); *H04L 43/026* (2013.01); *H04L 47/25* (2013.01); *H04L 47/32* (2013.01)

(58) Field of Classification Search
CPC ..... H04L 43/024; H04L 43/026; H04L 47/25; H04L 47/32
See application file for complete search history.

(56) References Cited

U.S. PATENT DOCUMENTS

| 8,514,723 | B2 | 8/2013 | Malomsoky et al. |
| 9,935,968 | B2 | 4/2018 | Pal et al. |
| 10,270,700 | B2 | 4/2019 | Burnette et al. |
| 2007/0041331 | A1* | 2/2007 | Ma .................. H04L 43/024 370/252 |

(Continued)

FOREIGN PATENT DOCUMENTS

| EP | 2291950 B1 | 1/2012 |
| WO | 2016141239 A1 | 9/2016 |
| WO | 2016160553 A1 | 10/2016 |

OTHER PUBLICATIONS

International Search Report and Written Opinion dated Jul. 14, 2020 cited in PCT/US20/30277.

(Continued)

*Primary Examiner* — Jae Y Lee
*Assistant Examiner* — M Mostazir Rahman
(74) *Attorney, Agent, or Firm* — Perkins Coie LLP

(57) ABSTRACT

The disclosed techniques include at least one method. The method includes receiving, by a network device, incoming packets communicated over a computer network, and detecting flows to which the incoming packets belong. Each incoming packet belongs to a flow of the flows. The method further includes sampling each incoming packet that satisfies a flow condition having a flow interval of packets for the flow of the incoming packet, and sampling each incoming packet that satisfies a global condition having a global interval of packets irrespective of the flow of the incoming packet. The method further includes storing any sampled packets or information indicative of any sampled packets.

26 Claims, 11 Drawing Sheets

(56) References Cited

U.S. PATENT DOCUMENTS

| | | | |
|---|---|---|---|
| 2008/0310460 A1* | 12/2008 | Bargauan | H04N 21/23608 370/522 |
| 2009/0303901 A1* | 12/2009 | Duffield | H04L 43/024 370/253 |
| 2011/0205916 A1 | 8/2011 | Dinan | |
| 2014/0112187 A1 | 4/2014 | Kang et al. | |
| 2014/0325649 A1 | 10/2014 | Zhang | |
| 2015/0085694 A1* | 3/2015 | Agarwal | H04L 43/04 370/253 |
| 2015/0236895 A1* | 8/2015 | Kay | H04L 43/045 709/224 |
| 2017/0126725 A1 | 5/2017 | Pal et al. | |
| 2019/0166020 A1 | 5/2019 | Mommileti | |
| 2019/0230008 A1 | 7/2019 | Labonté | |

OTHER PUBLICATIONS

U.S. Appl. No. 16/405,674 of Bharath Harikrishnan et al. filed May 7, 2019.

Non-Final Office Action dated Oct. 7, 2020 for U.S. Appl. No. 16/405,674, filed May 7, 2019, 38 pages.

Notice of Allowance dated May 26, 2021 for U.S. Appl. No. 16/405,674, 10 pages., filed May 26, 2021.

* cited by examiner

FIG. 10

| PACKET | 1 | 2 | 3 | 4 | 5 | 6 | 7 | 8 | 9 | 10 | 11 | 12 | 13 |
|---|---|---|---|---|---|---|---|---|---|---|---|---|---|
| FLOW | 1 | 1 | 1 | 2 | 1 | 1 | 1 | 2 | 1 | 3 | 2 | 1 | 1 |

FIG. 11

| PACKET | 1 | 2 | 3 | 4 | 5 | 6 | 7 | 8 | 9 | 10 | 11 | 12 | 13 |
|---|---|---|---|---|---|---|---|---|---|---|---|---|---|
| FLOW | 1 | 1 | 1 | 2 | 1 | 1 | 1 | 2 | 1 | 3 | 2 | 1 | 1 |
| SAMPLE | 1 | | | | 2 | | | | 3 | | | | 4 |

FIG. 12

| PACKET | 1 | 2 | 3 | 4 | 5 | 6 | 7 | 8 | 9 | 10 | 11 | 12 | 13 |
|---|---|---|---|---|---|---|---|---|---|---|---|---|---|
| FLOW | 1 | 1 | 1 | 2 | 1 | 1 | 1 | 2 | 1 | 3 | 2 | 1 | 1 |
| SAMPLE | 1 | | | 2 | | | | 3 | | 4 | | | 5 |

ADAPTIVE AND FLEXIBLE PACKET SAMPLING

This application claims to the benefit of U.S. Provisional Patent Application No. 62/545,913 titled "Adaptive and Flexible Packet Sampling" and filed on Aug. 15, 2017, which is incorporated by reference herein in its entirety.

FIELD

The disclosed teachings generally relate to techniques for improving flow monitoring of network traffic, and more particularly relate to a flow monitoring system that implements adaptive sampling to provide an accurate representative sample of network traffic and output the sampled traffic at a rate that prevents overloading or underutilization by the flow monitoring system.

BACKGROUND

A network analysis tool allows a network administrator to monitor network traffic for anomalous activity by collecting traffic information such as source and destination information, a class of service, and causes of congestion. For example, a flow monitoring system can implement a NETFLOW protocol to monitor and collect internet protocol (IP) traffic for subsequent analysis. The flow monitoring system can include a flow exporter, a flow collector, and an analysis application. The flow exporter can aggregate sampled packets of flows and exports flow data to the flow collector, which can store and pre-process the flow data with the analysis application for intrusion detection, traffic profiling, or the like.

The flow monitoring system can receive incoming packets from one or more sources over one or more networks and implement one or more sampling algorithms to sample the incoming packets. The sampled packets that are output for subsequent analysis are supposed to represent the various flows (of various sizes) received by the flow monitoring system. However, using conventional sampling algorithms results in sampled traffic that does not accurately represent the flows of incoming traffic. Further, the volume of sampled traffic is proportional to the incoming traffic, which causes overloading or underutilization by the flow monitoring system when a load of incoming traffic changes such that some packets are dropped. Thus, the analysis of network traffic is unreliable because the sampled traffic lacks information of some flows.

BRIEF DESCRIPTION OF THE DRAWINGS

One or more embodiments of the present invention are illustrated by way of example and not limitation in the figures of the accompanying drawings, in which like references indicate similar elements.

FIG. 10 depicts an example of incoming traffic to a network device.

FIG. 11 depicts deterministic sampling of the incoming traffic of FIG. 10.

FIG. 12 depicts adaptive sampling of the incoming traffic of FIG. 10.

FIG. 13 depicts another example of incoming traffic to a network device with a higher rate that doubles the volume of incoming packets.

FIG. 14 depicts deterministic sampling of the incoming traffic of FIG. 13.

FIG. 15 depicts adaptive sampling of the incoming traffic of FIG. 13.

DETAILED DESCRIPTION

Figure 1A:
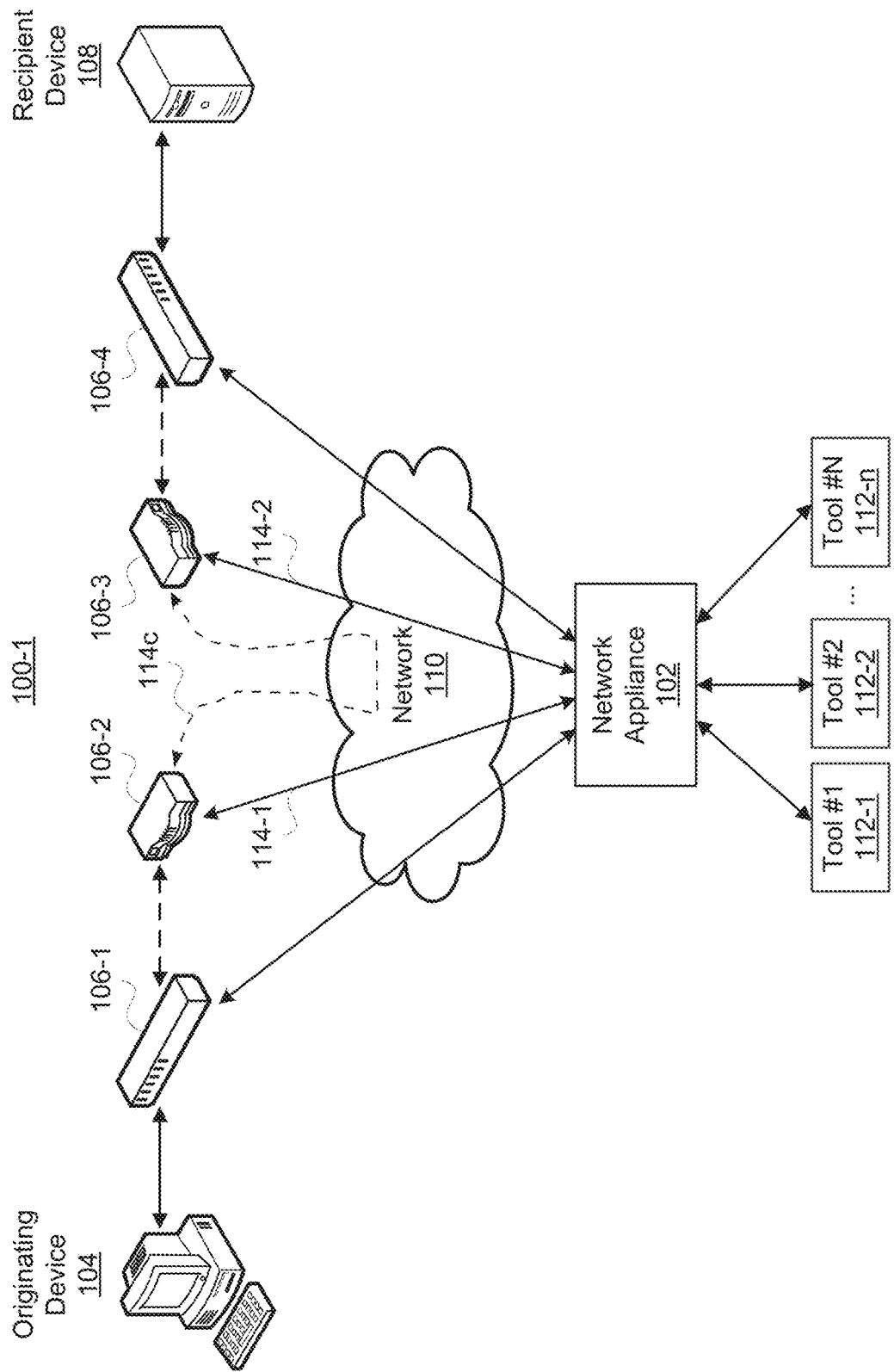
FIG. 1A depicts an example of a network arrangement in which a network device receives data packets from nodes in a computer network.

Reference to "one embodiment" or "an embodiment" means that a particular feature, structure, or characteristic described in connection with the embodiment is included in at least one embodiment introduced herein. The appearances of the phrase "in one embodiment" in this disclosure are not necessarily all referring to the same embodiment, nor are separate or alternative embodiments necessarily mutually exclusive of other embodiments. Moreover, features are described that may be exhibited by some embodiments and not by others. Similarly, features described herein may be requirements of some embodiments and not for other embodiments.

As used herein, unless specifically stated otherwise, terms such as "processing," "computing," "calculating," "determining," "displaying," "generating," or the like, refer to actions or processes of an electronic device that manipulates and transforms data, represented as physical (electronic) quantities within the computer's memory or registers, into other data similarly represented as physical quantities within the device's memory, registers, or other such storage medium, transmission, or display devices.

When used in reference to a list of multiple items, the word "or" is intended to cover all of the following interpretations: any of the items in the list, all of the items in the list, and any combination of items in the list. Unless context clearly requires otherwise, throughout the description and the embodiments, the words "comprise," "comprising," and the like are to be construed in an inclusive sense, as opposed to an exclusive or exhaustive sense; that is to say, in the sense of "including, but not limited to."

The terms "connected," "coupled," or any variant thereof mean any connection or coupling, either direct or indirect, between two or more elements; the coupling of or connection between the elements can be physical, logical, or a combination thereof. For example, two components may be coupled directly to one another or via one or more intermediary channels or components. As another example, devices may be coupled in such a way that information can be passed there-between, while not sharing any physical connection with one another.

Introduced herein is at least one technique of a flow monitoring system that can perform adaptive sampling to improve network traffic collection for analysis. For example, a network device can include a sampling engine of the flow monitoring system that is deployed at an ingress point to control the number of packets output (e.g., exported) for subsequent analysis. The sampling engine can prevent overloading or underutilization of a packet processing component by enforcing an adaptive sampling rate that conforms to a constant output rate. The sampling rate can be dynamically adapted for a changing pattern or load of incoming traffic to satisfy the output rate. For example, each flow can have its own variable sampling rate, a sampling rate can satisfy a number of conditions, and/or the sampling engine can collect information from flows of a certain size. The sampling engine can adapt a sampling rate based on information of the most recently sampled packets for a particular flow and/or globally among all flows.

General System Overview

FIG. 1A depicts an example of a network arrangement 100-1 in which a network device 102 receives data packets from multiple devices and/or applications (collectively referred to as "nodes") in a computer network 110. The nodes (e.g., switches 106-1, 106-4 and routers 106-2, 106-3) couple an originating device 104 (e.g., desktop computer system) to a destination device 108 (e.g., server) and allow data packets to be transmitted between the originating device 104 and the destination device 108. Examples of nodes include switches, routers, and network taps.

Each node represents an entry point into the computer network 110. The entry points, however, could be, and often are, from different points within the computer network 110. Generally, at least some of the nodes are operable to transmit data packets received as network traffic (or duplicate copies of the data packets) to a network device 102 for analysis. Thus, network traffic is directed to network device 102 by a node that provides an entry point into the computer network 110.

Whether a node transmits the original data packets or copies of the data packets to a device downstream of the node (e.g., the network device 102) depends on whether the downstream device is an inline device or an out-of-band device. As noted above, inline devices receive the original data packets, while out-of-band devices receive copies of original data packets. Generally, the network device 102 is deployed as an inline device and, thus, receives original data packets from whichever device is immediately upstream of the network device 102.

Here, for example, the network device 102 can receive original data packets from node 106-2 (e.g., via transmission path 114-1) and pass at least some of the original data packets to node 106-3 (e.g., via transmission path 114-2). Because node 106-2 is able to transmit network traffic downstream through the network device 102, node 106-2 need not be coupled directly to node 106-3 (i.e., transmission path 114c may not exist). Some or all of the nodes within the computer network can be configured in a similar fashion.

When the network device is deployed as an inline device, data packets are received by the network device at a (physical) network port of the network device. For example, data packets transmitted by node 106-2 via transmission path 114-1 are received by the network device 102 at a particular network port. The network device may include multiple network ports coupled to different nodes in the computer network 110. The network device 102 can be, for example, a monitoring platform that includes a chassis and interchangeable blades offering various functionalities, such as enhanced packet distribution and masking/filtering capabilities.

The network device 102 can also include multiple (physical) tool ports coupled to different network tools 112-1 through 112-n. As further described below, each network tool 112-1 through 112-n can be deployed as an inline device or an out-of-band device at any given point in time. An administrator of the network device 102 may be able to switch the deployment mode of one or more of the network tools 112-1 through 112-n. That is, the administrator may be able to deploy an out-of-band network tool as an inline device and vice versa. When a network tool is deployed as an out-of-band device, the network device 102 creates a duplicate copy of at least some of the data packets received by the network device 102, and then passes the duplicate copies to a tool port for transmission downstream to the out-of-band network tool. When a network tool is deployed as an inline device, the network device passes at least some of the original data packets to a tool port for transmission downstream to the inline network tool, and those packets are then normally subsequently received back from the tool at a separate tool port of the network device, assuming the packets are not blocked by the tool.

Figure 1B:
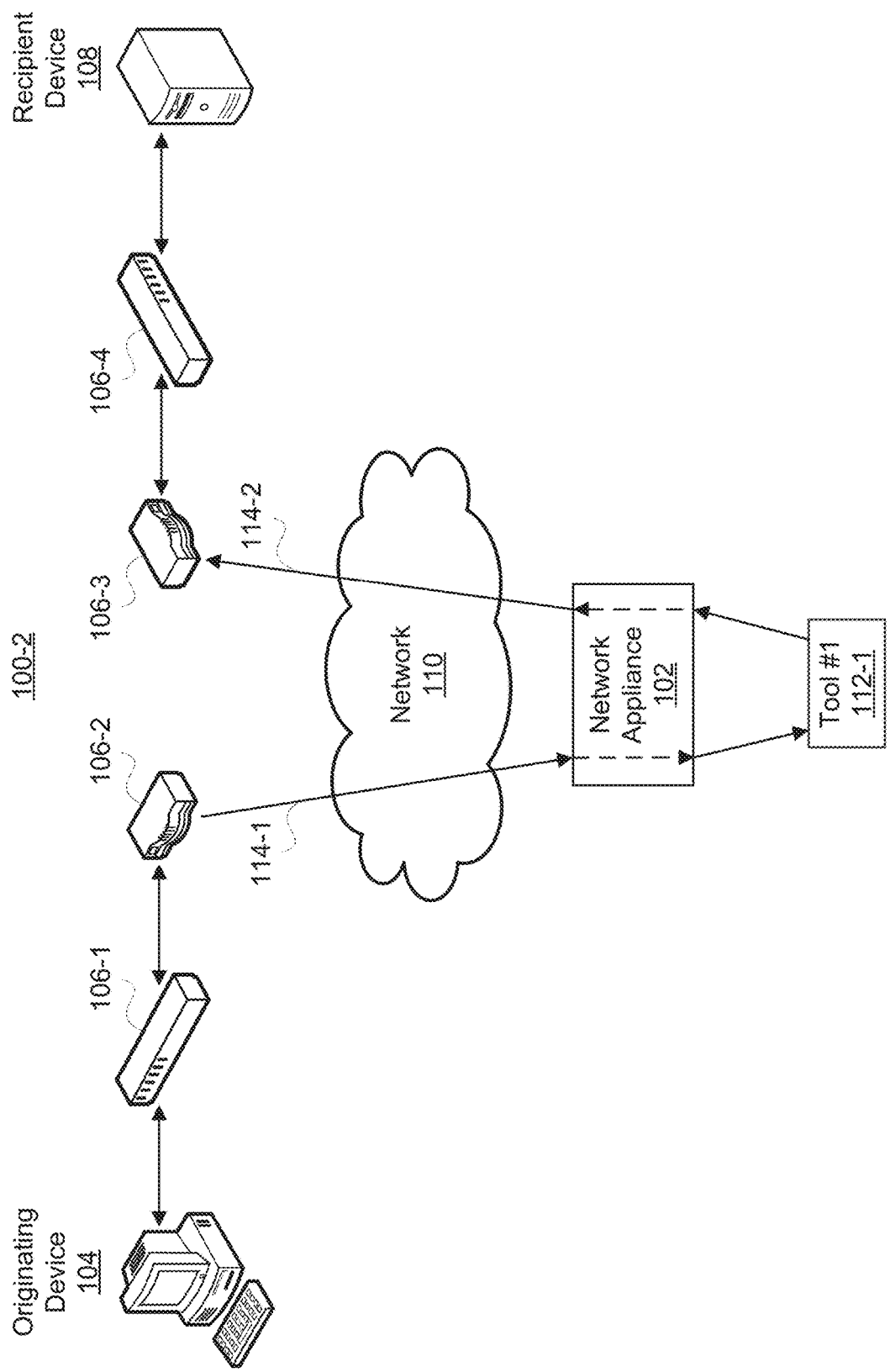
FIG. 1B depicts another example of a network arrangement in which a network device receives data packets from a node in a computer network.

FIG. 1B illustrates an example path of a data packet as the data packet travels from an originating device 104 to a destination device 108. More specifically, FIG. 1B depicts a network arrangement 100-2 in which the network device 102 and a network tool 112-1 are both deployed as inline devices (i.e., within the flow of network traffic). Although the transmission paths connecting network device 102 and tool 112-1 are half duplex wires (i.e., only transmit information in one direction), full duplex wires capable of transmitting information in both directions could also be used for some or all of the transmission paths between nodes of the computer network.

Upon receiving a data packet from node 106-2, the network device 102 identifies a flow map corresponding to the data packet based on one or more characteristics of the data packet. For example, the characteristic(s) could include the communication protocol of which the data packet is a part (e.g., HTTP, TCP, IP) or a session feature (e.g., a timestamp). Additionally or alternatively, the proper flow map could be identified based on the network port (of the network device) on which the data packet was received, or the source node from which the data packet was received.

The flow map represents a policy for how the data packet is to be handled by the network device 102. For example, the flow map could indicate that the data packet is to be aggregated with another data packet, filtered, sampled, modified (e.g., stripped of a header or payload), or forwarded to one or more tool ports. Moreover, the flow map could specify that the data packet is to be transmitted in a one-to-one configuration (i.e., from a network port of the network device 102 to a tool port of the network device 102) or one-to-many configuration (i.e., from a network port of the network device 102 to multiple tool ports of the network device 102). Similarly, a single tool port of the network device 102 could receive data packets from one or more network ports of the network device 102.

Often, the data packet is passed (e.g., by a processor of the network device 102) to a tool port for transmission downstream to a network tool (e.g., a monitoring and/or security-related tool). Here, for example, the flow map may specify that the data packet is to be passed by the network device 102 to a tool port for transmission downstream to tool 112-1. The network device may aggregate or modify the data packet in accordance with the policy specified by the flow map before passing the data packet to a tool port for transmission downstream to the network tool 112-1. In some embodiments, the network device 102 includes multiple tool ports, each of which is coupled to a different network tool.

After analyzing the data packet, the tool 112-1 normally transmits the data packet back to the network device 102 (i.e., assuming the tool 112-1 does not determine that the packet should be blocked), which passes the data packet to a network port for transmission downstream to another node (e.g., node 106-3). Because the data packet is transmitted from node 106-2 to node 106-3 through the network device 102 and tool 112-1, it is important to quickly and accurately identify potentially malicious data traffic before forwarding the traffic to downstream devices.

Flow Monitoring System

Figure 2:
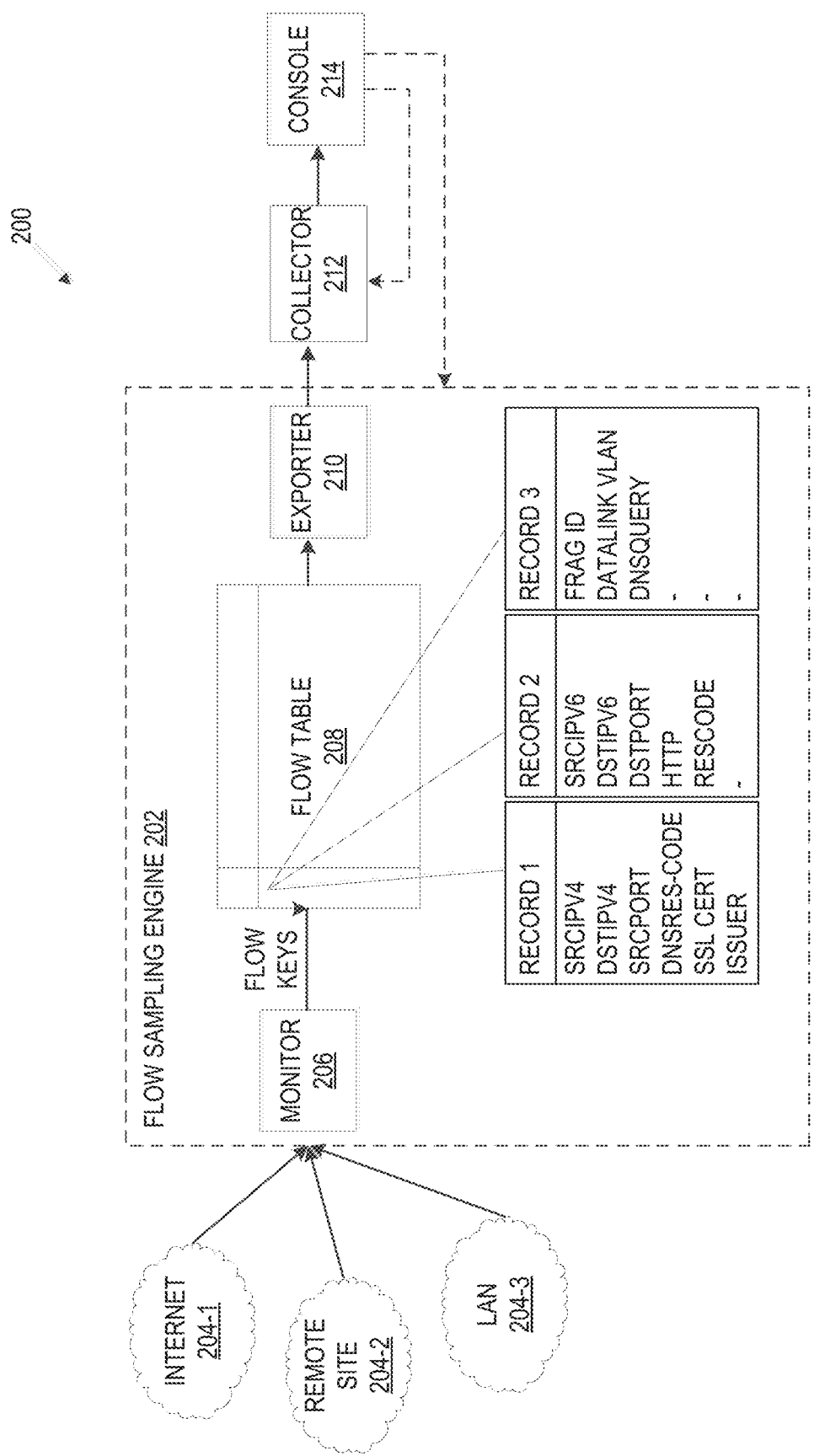
FIG. 2 is a block diagram illustrating a flow monitoring system that can perform adaptive sampling to improve network traffic collected for analysis.

FIG. 2 is a block diagram illustrating a flow monitoring system that can perform adaptive sampling to improve network traffic collection for analysis. For example, the flow monitoring system 200 can collect and analyze network traffic such as internet protocol (IP) packets. As shown, the flow monitoring system 200 includes a flow sampling engine 202 that receives network traffic at an ingress point from various sources over various networks ("network sources 204"). For example, a network device of a local network can implement the flow sampling engine 202 to sample traffic incoming to an ingress port.

The flow sampling engine 202 includes a monitor 206 that can monitor network traffic received from the network sources 204. The monitor 206 may include a packet processor engine that can sort flow information and record it to a flow table 208. The flow table 208 can include entries of, among other things, information about a last sampled packet for each particular flow and a last sampled packet of a number of packets irrespective of any flow. As discussed further below, the entries of the flow table 208 can be used to adapt a sampling rate and to export flow information by the flow monitoring system 200 in a manner that avoids overloading or underutilization.

The exporter 210 exports the flow information retrieved from the flow table 208 to the collector 212 via an egress point of the flow sampling engine 202 (e.g., egress port of a network device). A console 214 enables a user to analyze traffic by querying the collector 212. For example, the console 214 may include a network portal used by an administrator to access flow information maintained by the collector 212 and instruct the collector 212 to analyze flow information.

Each component or device of the flow monitoring system 200 may include combinations of hardware and/or software that can process information, perform functions, or communicate over networks. For example, any component or device of the flow monitoring system 200 may include a processor, memory or storage, a network transceiver, a display, an operating system (OS) and application software (e.g., for providing a user interface), and the like. Other components, devices, hardware, and/or software of the flow monitoring system 200 that would be known to persons skilled in the art are not shown or discussed herein for the sake of brevity. Moreover, although the various items of FIG. 2 are shown as separate and distinct components or devices, other embodiments may include fewer or a single component or device that performs a combination or all of the functions of the components or devices of FIG. 2.

The network sources 204 may include any combination of private, public, wired, or wireless networks or portions of the network sources 204 coupling to the flow sampling engine 202. As illustrated, the network sources 204 include the Internet 204-1, a remote site 204-2, and a local area network (LAN) 204-3. The information communicated from the network sources 204 over networks may be encrypted or unencrypted at various locations or along different portions of the networks.

The flow sampling engine 202 can be located at an ingress point of a local or private network to collect flow information from the network sources 204. For example, the flow sampling engine 202 may be located at the edge of a local or private network. Hence, the flow sampling engine 202 can belong to a local or private network and interface with the network sources 204 and the collector 212. The flow sampling engine 202 can sample network traffic incoming from the networks sources 204. As such, the flow sampling engine 202 can sample representative network traffic for inspection by an administrator via the console 214. For example, the flow monitoring system 200 can be part of a security system for inspecting and mitigating the effects of anomalous traffic.

The packet processing engine of the monitor 206 can implement one or more sampling algorithms to process the incoming packets from the network sources 204. Existing sampling techniques of network traffic can follow a Pareto distribution (i.e., few heavy flows and long tail of light flows) such that deterministic sampling will result in samples mostly from the heavy flow rather than samples among all flows including those of the long tail of the distribution.

For example, the monitor 206 can implement a deterministic sampling process such as 1-in-N sampling of incoming packets from a combination of flows, where N could be an integer value. A smaller N would increase the sampling resolution (e.g., more samples) but also increase the risk of creating a bottleneck at the ingress point of the flow sampling engine 202. A greater value of N would increase sampling efficiency and avoid a bottleneck but would increase the likelihood that only larger flows are recorded to the flow table 208.

In some embodiments, the monitor 206 can perform packet-based sampling of a number of packets of a flow that exceeds a threshold minimum number of packets. In some embodiments, the monitor 206 can perform packet-based sampling of a number of packets of a flow that is less than a threshold maximum number of packets. In some embodiments, the monitor 206 could perform flow-based sampling such that only packets from certain flows are sampled. For example, the monitor 206 could sample incoming traffic of some flows and not others.

The monitor 206 can aggregate sampled packets into flow records stored in the flow table 208. The flow table 208 may include one or more flow entries and one or more actions associated with each flow entry. An action could cause the flow sampling engine 202 to process or export a flow of packets. Examples of actions include forwarding packets to another flow table or to the exporter 210, which can then export the packets from the flow sampling engine 202 through one or more egress ports to one or more collectors (e.g., collector 212). Other actions may include encapsulating and forwarding packets to a controller, which may decide if a new flow entry should be added to the flow table 208. Other actions include dropping packets, rewriting portions of a packet header, mapping packets of a flow to a specific priority class, etc. In some embodiments, statistics counters may be implemented for each flow entry of the flow table 208. Thus, the flow table 208 may be modified by adding, deleting, or changing the information that it contains.

The exporter 210 can output (e.g., export) flow records (e.g., including sampled packets) to the collector 212, which can store and pre-process flow data received from the exporter 210. As such, the data exported to a collector 212 can be sampled from the incoming network traffic. In some embodiments, the console 214 could be implemented using an end-user device including any of various types of smartphones (e.g., APPLE IPHONE, SAMSUNG GALAXY, NOKIA LUMINA), tablet computers (e.g., APPLE IPAD, MICROSOFT SURFACE), computers (e.g., APPLE MACBOOK, LENOVO THINKPAD), and any other computing device that is capable of communicating information.

In some embodiments, a user can program a behavior of the flow sampling engine 202 by using the console 214. In some embodiments, there may be one or more devices (e.g., computers, handheld devices) that are communicatively coupled to the flow sampling engine 202. In such cases, each user of the devices may communicate with the flow sampling engine 202 through the console 214, and may program a behavior of the flow sampling engine 202 through an open source or proprietary protocol. In some embodiments, a device that is communicating with the console 214 is considered a user. Thus, the term "user" may refer to a device or a person using the device.

In some embodiments, the collector 212 or console 214 can include analysis software applications to process the flow information received from the flow sampling engine 202. An analysis application may perform intrusion detection or traffic profiling of sampled traffic. By analyzing the flow information, a network administrator can obtain insights about the network traffic flow and volume including, for example, the source and destination of traffic, class of service, and causes of congestion.

In some embodiments, the flow table 208 may be configured using hardware and/or software based on a standard protocol, which refers to a network transmission protocol that has been setup and established by a standard setting organization, and has been used by existing commercially available network devices (e.g., network switches) for transmitting network data.

In some embodiments, the flow table 208 may be configured in accordance with a proprietary protocol. For example, the console 214 can be used by an administrator to access the flow sampling engine 202 through a proprietary protocol, and program the flow sampling engine 202 to behave in a desired manner. The programming of the flow sampling engine 202 may involve adding, deleting, or modifying information. For example, the console 214 may be a computer running a flow control application software for configuring the flow table 208.

In some embodiments, the flow sampling engine 202 may have one or more flow entries in one or more flow tables 208 that can forward packets through standard packet processing paths and other flow entries in the flow tables 208 that can forward packets through proprietary packet processing paths. As such, a user of the console 214 can query the flow sampling engine 202 using standard or proprietary protocols, and the flows can be processed using one type of protocol while the rest of the flows may be processed using a different type of protocol. In some instances, the flow sampling engine 202 may be a dedicated proprietary device. In such instances, the flow sampling engine 202 performs switching and/or routing functions completely based on one or more available protocols, and all flow table entries can be controlled by a user in accordance with one or more of the available protocols.

Figure 3:
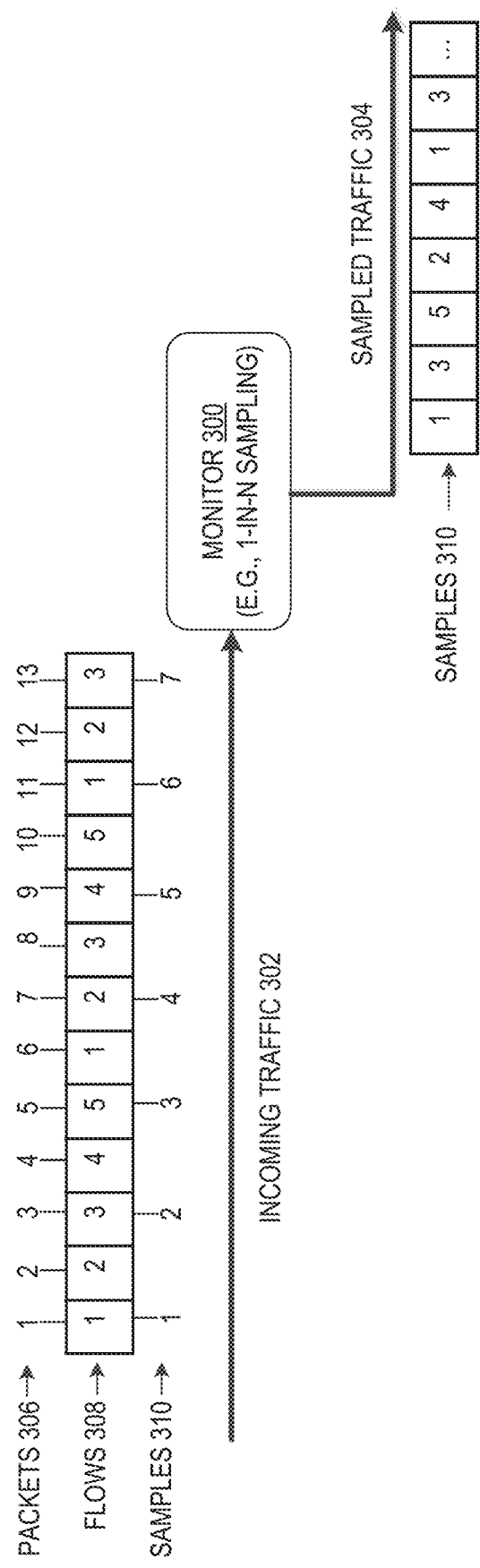
FIG. 3 is a block diagram illustrating deterministic packet sampling.

FIG. 3 is a block diagram illustrating an example of deterministic packet sampling. In particular, a monitor 300 receives incoming traffic 302, applies 1-in-N packet sampling, and then outputs sampled traffic 304. The incoming traffic 302 includes thirteen packets 306 of five different flows 308. The packets 306 are represented as blocks containing numbers indicating their respective flows 308. For example, packet #10 belongs to flow #5. The monitor 300 implements 1-in-N packet sampling where N=2. Hence, every other packet of the incoming traffic 302 is sampled. Accordingly, there are seven of the thirteen packets 306 that are sampled packets 310 of the flows 308. The sampled packets 310 output by the monitor 300 belong to flows #1, #3, #5, #2, #4, #1, and #3, respectively.

The deterministic sampling of incoming traffic can have various disadvantages. For example, a monitor typically receives numerous flows of various sizes and at different times, from different sources. A monitor could receive combinations of heavier flows with greater volumes of packets and lighter flows with relatively lighter volumes of packets. The application of 1-in-N sampling to this combination of flows could result in sampled traffic that does not accurately represent each flow or relative flow volumes with respect to the incoming traffic.

Figure 4:
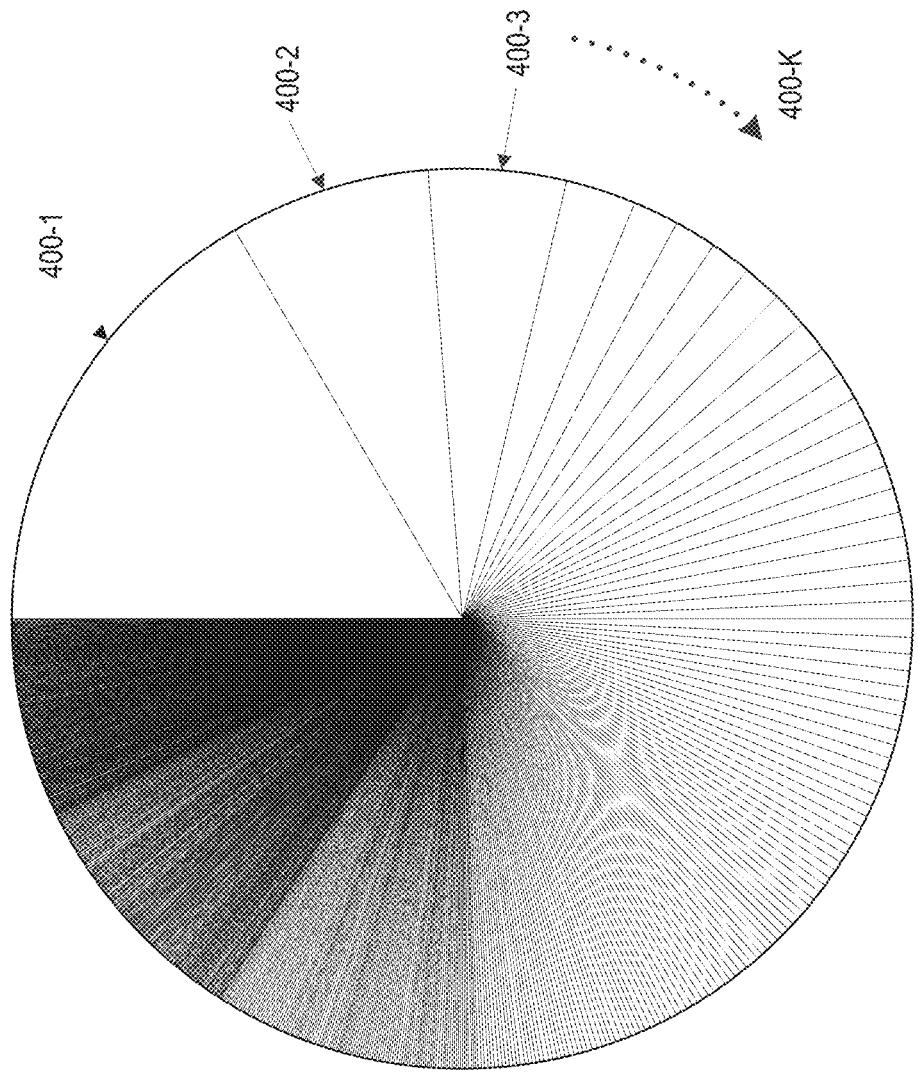
FIG. 4 is a chart illustrating a distribution of incoming packets that belong to distinct flows received by a network device.

FIG. 4 is a chart illustrating a distribution of incoming packets that belong to different flows. The total area of the chart represents the total volume of packets received by a flow sampling engine. The total packets are distributed among K different flows. The relative size of a wedge represents the relative volume of packets for each of the K flows. As such, the volume of flow 400-1 is greater than the volume of flow 400-2, which is greater than the volume of flow 400-3, and so on for all 400-K flows. Hence, flow 400-1 represents a heavier flow compared to the lighter flow 400-2.

Referring back to FIG. 2, the flow sampling engine 202 receives more packets from flow 400-1 compared to flow 400-3. Therefore, the flow sampling engine 202 that implements a deterministic sampling algorithm will yield sampled traffic that is biased towards the flow 400-1 while having fewer samples from flows 400-2, 400-3, and so on to 400-K. A solution to overcome this drawback is to increase a sampling rate. However, doing so would cause a bottleneck at the flow sampling engine 202.

Any sampling technique that operates independent of flows can result in a mismatch between relative proportions of packet volumes from incoming flows and sampled flows. Accordingly, the sampling techniques that implement deterministic or static sampling irrespective of flows perform "random" or "pseudo-random" flow sampling. That is, the packets of flows are sampled randomly without considering changes in flows, which leads to sampled traffic that does not accurately represent the incoming traffic. The static sampling rate can also result in an overloading (overflows) or underutilization by the flow monitoring system 200 when a load of incoming traffic changes. Further, the sampled traffic will be biased to heavier flows compared to lighter flows. Thus, in the presence of a few heavy flows, the vast majority of the sampled packets will be from the heavier flows and the information of the other flows (e.g., tail of a flow distribution) could be lost.

Figure 5:
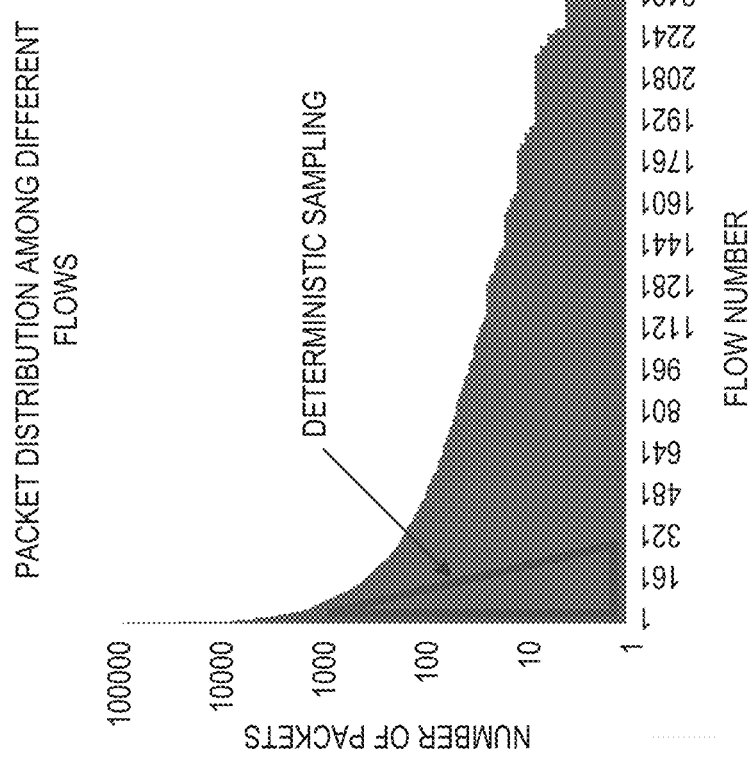
FIG. 5 is a graph illustrating a distribution of deterministically sampled packets relative to a distribution of flows received by a network device.

FIG. 5 is a graph illustrating an example of deterministic sampling on a distribution of different flows of incoming traffic received by a flow sampling engine. The graph shows the number of packets as a function of flow number, where a flow number represents a particular flow. In this example, a packet count is larger for smaller flow numbers than the packet count for larger flow numbers.

Application of deterministic sampling to the incoming traffic of this distribution of flows results in sampled traffic irrespective of the volume of packets per flow. This will result in sampled traffic that is biased towards the heavier flows of smaller flow numbers and will completely exclude sampled packets of larger flow numbers. Thus, application of a deterministic sampling rate leads to sampled traffic that does not accurately represent incoming traffic because the sampling is not performed proportional to the number of packets by flow.

Figure 6:
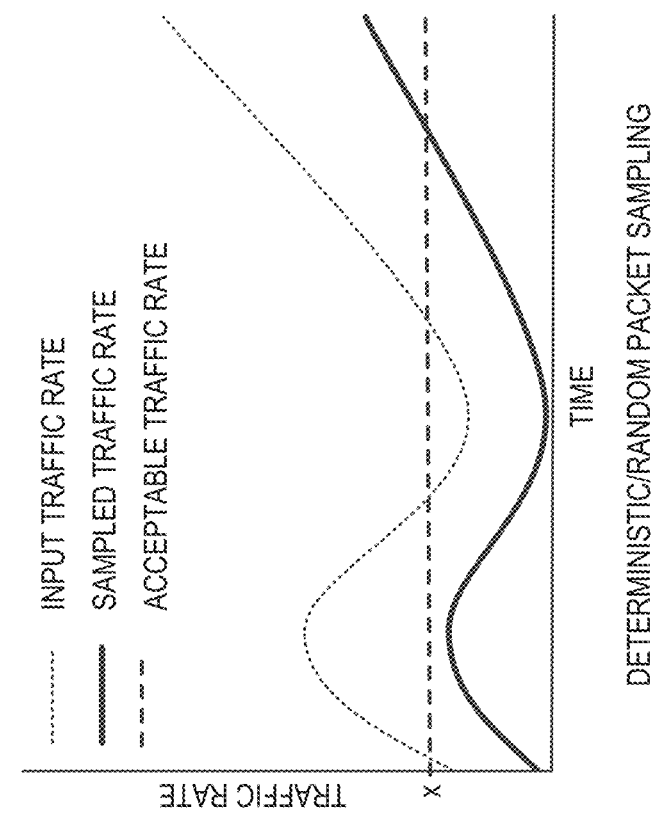
FIG. 6 is a graph illustrating a deterministically sampled traffic rate relative to an input traffic rate and an acceptable rate.

FIG. 6 is a graph illustrating a deterministic sample traffic rate relative to an input traffic rate and acceptable traffic rate. The acceptable rate (x) is a constant value that would avoid overloading and/or underutilization by a flow monitoring system. For example, the acceptable rate may be determined based on the configuration of a packet processing component/device, or a desired number of sampled packets exported by a flow monitoring system. For example, a packet processing component may efficiently process 100 packets per second and, as such, it would be desirable for the packet processing component to receive no more and no less than that amount.

The input traffic rate is shown to change over time. As a result, application of a deterministic packet sampling results in a sampled traffic rate that is proportional to the input traffic rate. Accordingly, the sampled traffic could overload and/or underutilize devices or components of a flow monitoring system by failing to consistently maintain a sample traffic rate equal to the acceptable rate. In particular, application of deterministic packet sampling could overload and/or underutilize a packet processing engine of a flow monitoring system. The devices such as a collector that consumes an output of the flow sampling engine could receive less traffic from the flow sampling engine as a result.

Adaptive Packet Sampling

The disclosed technology overcomes the aforementioned drawbacks to obtain sampled traffic with sampled flows in proportion to incoming traffic flows, and can output sampled traffic at a rate that avoids overloading and/or underutilization. In some embodiments, a flow sampling engine implements an adaptive and flexible packet sampling algorithm ("adaptive sampling algorithm") that adjusts to the limited capabilities of existing systems. A flow sampling engine that implements an adaptive sampling algorithm can prevent a flow monitoring system (which generates aggregated flow information) from dropping packets when there is a network traffic overload. In some embodiments, the flow sampling engine implements the adaptive sampling algorithm inline at an ingress point of a flow monitoring system to limit the number of sampled packets. Thus, a flow sampling engine can facilitate packet sampling of most or all flows rather than sampling packets of only a few heavier flows.

In some embodiments, the output of the flow sampling engine has a fixed output rate. For example, the output rate can be set by a user or dynamically adjusted based on a specification of packet processing component to prevent overloading or underutilization. The flow sampling engine implements a sampling rate that is dynamically adapted as a function of a load of incoming traffic to satisfy the output rate. In some embodiments, the sampling rate is different and/or varies for each flow of incoming traffic. For example, a sampling rate can depend on a pattern and load of the incoming traffic for any flows. In some embodiments, the flow sampling engine can apply one or more conditions that must be satisfied to sample a flow and can be configured to sample packets only on flows of a size within a of specific range to provide intelligent and selective sampling. In some embodiments, the flow sampling engine can aid in collecting aggregate information about flows of all incoming traffic such as the number of received packets, which can be used to adjust a sampling rate to satisfy the output rate.

The disclosed techniques result in efficient use of the flow monitoring system with accurate sampled traffic that represents most or all flows rather than only a few heavier flows. For each flow, the flow sampling engine can maintain information indicative of the last time a packet belonging to a particular flow was sampled. For example, a flow table can store information about the most recently sampled packet for each flow. The flow sampling engine can also store the last time a packet was sampled globally among all flows. This configuration assumes knowing an acceptable processing rate of the flow monitoring system (e.g., of its packet processing engine), which should equal the output rate of the flow sampling engine.

In an implementation, a global interval is defined by a period of time or a number of packets in which a packet should be sampled for all traffic irrespective of its flows to satisfy the output rate. This interval is calculated as the reciprocal of output rate. A flow interval is defined by a period of time or a number of packets in which a packet should be sampled for a particular flow to satisfy output rate and a fairness condition. The flow interval is calculated by dividing the number of distinct flows in a global interval by the output rate.

The flow table can store entries of information used to dynamically adjust a sampling rate. For example, the flow table may include an entry indicating the last time a packet was sampled for a particular flow. The flow table may also include an entry indicating the last time a packet was sampled for the entire flow table. The values stored in the flow table are used to adapt a sampling rate to dynamically sample a proportional number of packets across flows to avoid random or pseudo-random sampling of flows.

Figure 7:
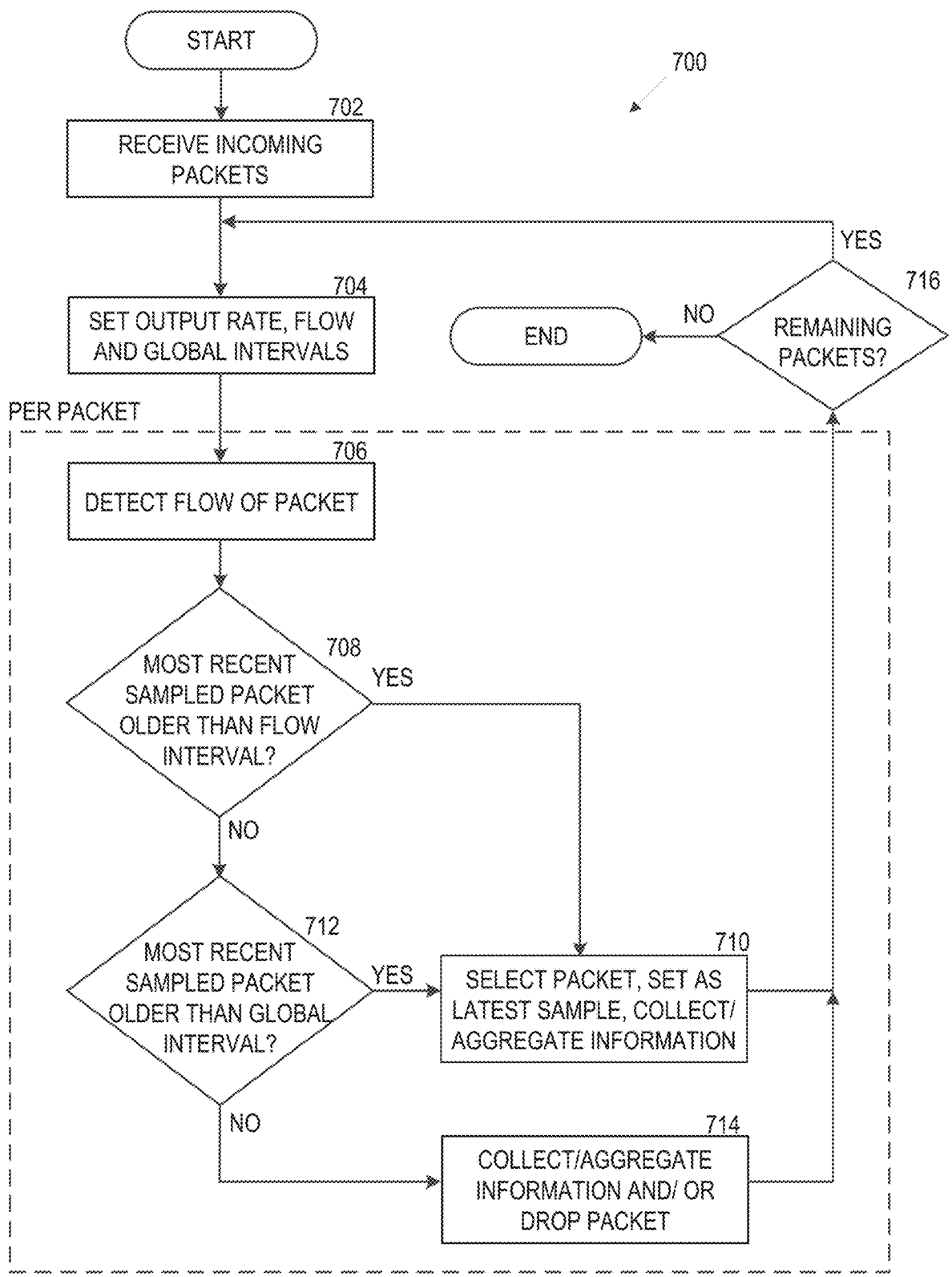
FIG. 7 is a flowchart illustrating adaptive and flexible packet sampling.

FIG. 7 is a flowchart illustrating adaptive and flexible packet sampling. In particular, the process 700 depicts an adaptive sampling algorithm that can be implemented by a flow monitoring system. In step 702, a network device including a flow sampling engine receives a number of incoming packets from one or more sources over one or more networks.

In step 704, a number of parameters are set for the flow sampling engine. For example, the output rate of a flow sampling engine can be set to a particular value. The flow sampling engine could also have its global interval set to the reciprocal of the output rate. The global interval defines a period of time or number of packets in which a packet should be sampled from among all flows of a traffic load to satisfy a global condition relative to the output rate. The flow sampling engine could also have its flow interval set to the number of distinct flows in the global interval divided by the output rate. The flow interval defines a period of time or number of packets in which a packet should be sampled from a particular flow to satisfy a fairness condition relative to the output rate. Although shown after step 702, the output rate, global interval, and flow interval can be set at any time before sampling packets or dynamically adjusted to achieve a sampled traffic that avoids overloading and underutilization.

The subsequent steps of the process 700 are implemented for each packet of incoming traffic. In step 706, the flow sampling engine detects the particular flow to which an incoming packet belongs. For example, the flow sampling engine can use pre-defined keys to detect the flow of an incoming packet.

The packet is then tested against a number of conditions to determine whether it should be selected as a sample packet. In step 708, a flow condition requires checking the last time that a packet was sampled for the flow to which the packet belongs. That is, the flow condition requires determining whether the most recent sampled packet for the flow was obtained in the flow interval or is older than the flow interval. The flow condition is a "fairness" condition meant to ensure that the sampled traffic has a number of sampled packets for each flow that is proportionate to the number of packets for the flow of the incoming traffic.

In step 710, if the most recent sampled packet is older than the flow interval, the flow sampling engine selects the packet as a sample packet that satisfies the flow condition relative to the output rate. The sampled packet is recorded to a flow table and an entry indicating the latest sampled packet for the flow is updated to reflect the newly sampled packet. On the other hand, if the most recently sampled packet of the flow had been sampled in the flow interval, the packet is tested against a global condition to determine whether the packet should be sampled.

In step 712, if the most recent sampled packet irrespective of any flow in older than a global interval, the flow sampling engine selects the packet as a sample packet that satisfies the global condition relative to the output rate. In particular, satisfying the global condition prevents underutilization. The sample packet is recorded to the flow table and the entry indicating the latest sampled packet for the flow is updated to reflect the newly sampled packet (e.g., updated to the current time). In some embodiments, the flow table could include a distinct entry indicating the most recent global sampled packet which could be updated with the newly sampled packet (e.g., updated to the current time). In some embodiments, the flow sampling engine could determine the global sampled packet by checking the most recent sampled packet for each flow in the global interval. If the most recent sampled packet of any flow is within the global interval, the packet is not sampled.

In step 714, if neither the flow condition or the global condition is satisfied, the flow sampling engine may collect and aggregate information about the packet for use to adjust sampling parameters of the flow sampling engine. Information collected at this stage could be the number or size of the packets in the original traffic in general or per flow (e.g., sampled and dropped). For example, an entry of the flow table could be updated to reflect a total number of packets for a flow that have been processed by the adaptive sampling algorithm. Note that the same information for the packet could be recorded when the packet is sampled in accordance with step 710. The packet could also be dropped without further processing in step 714.

In step 716, the process 700 determines whether there are any remaining incoming packets to sample. If so, the steps 706 through 714 are iteratively applied to each incoming packet until all the incoming packets have been evaluated.

Although shown as a particular arrangement of steps in a particular order, the steps of process 700 can be arranged in another order omit certain steps or include omitted steps to achieve to achieve sampled traffic that is representative of incoming traffic and output by a flow monitoring system at a suitable rate.

Figure 8:
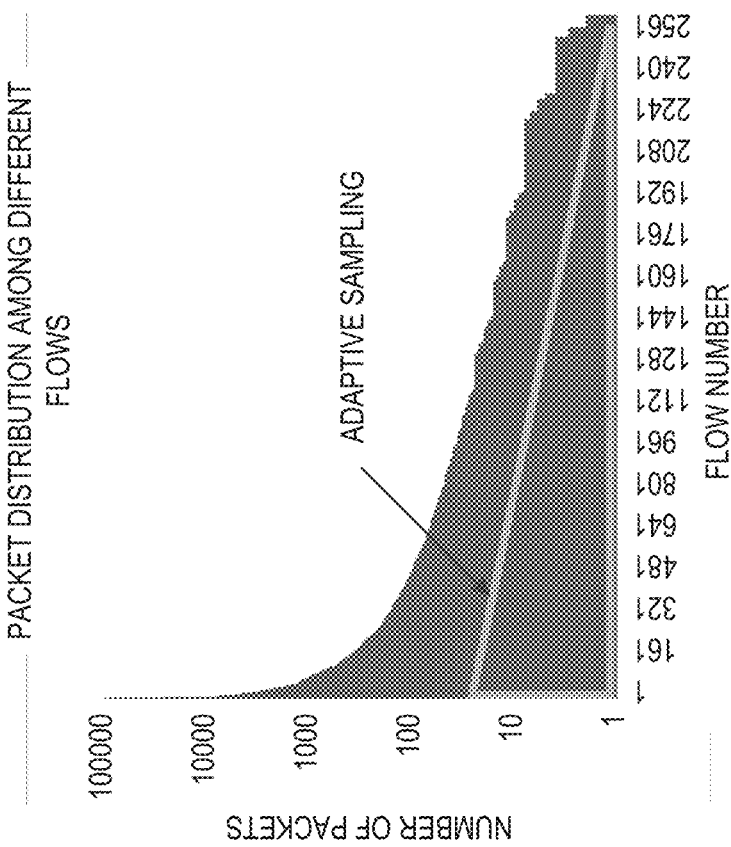
FIG. 8 is a graph illustrating a distribution of adaptively sampled packets relative to a distribution of flows received by a network device.

FIG. 8 is a graph illustrating an implementation of a adaptive sampling on a distribution of different flows of incoming traffic received by a flow sampling engine. The graph shows the number of packets as a function of flow number, where a flow number represents a particular flow. Similar to FIG. 5, a packet count is larger for smaller flow numbers than the packet count for larger flow numbers.

Unlike deterministic sampling, adaptive sampling samples packets from incoming traffic by considering the number of packets per flow. As shown, application of an adaptive sampling algorithm will result in sampled traffic that is proportional to the number of packets per flow of incoming traffic. Thus, the packets of lighter flows are sampled in proportion to all the flows rather than being lost as is the case with deterministic sampling that is biased towards heavier flows. Accordingly, application of adaptive sampling leads to sampled traffic that accurately represents the relative proportion of flows of incoming traffic because the sampling is performed in relative proportion to the number of packets per flow.

Figure 9:
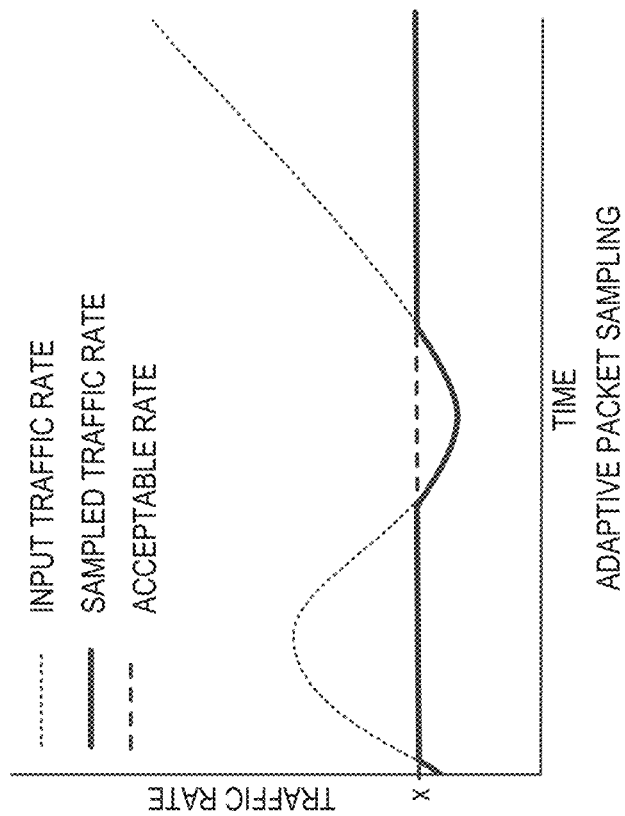
FIG. 9 is a graph illustrating an adaptively sampled traffic rate relative to an input traffic rate and an acceptable rate.

FIG. 9 is a graph illustrating an adaptive sampled traffic rate relative to an input traffic rate and acceptable traffic rate. The acceptable rate (x) is a constant value that would avoid overloading or underutilization by a packet processing engine of sampled traffic. For example, the acceptable rate may be determined based on the configuration of packet processing components or a desired number of sampled packets exported by a flow monitoring system.

The input traffic rate is shown to change over time. Application of adaptive packet sampling results in a sampled traffic rate that more closely conforms to the constant acceptable rate rather than being proportional to the variable input traffic rate. In particular, the sampled traffic does not exceed the acceptable rate and closely tracks the input traffic rate compared to the deterministic sampling illustrated in FIG. 6, which helps avoid overloading or underutilization.

First Example Embodiment

A first example of sampling algorithms implemented by a flow sampling engine is illustrated in FIGS. 10 through 12. In particular, FIG. 10 depicts an example of an incoming network traffic (from left to right) to a flow sampling engine. The incoming traffic includes thirteen packets that belong to flows #1, #2, or #3. Each packet is represented as a block that contain a number indicating the flow to which the packet belongs. The incoming traffic includes nine packets from flow #1, three packets from flow #2, and one packet from flow #3. As such, flow #1 is heavier than flow #2, which is heavier than flow #3. If the packet rate is 1 packet per second (pps), all this incoming traffic would have a duration of thirteen seconds. Note, however, that knowing the incoming rate is unnecessary to perform adaptive sampling.

FIG. 11 depicts an implementation of a deterministic sampling algorithm on the incoming traffic of FIG. 10. In the illustrated example, a 1-in-N sampling algorithm is implemented by the flow sampling engine, where N=4. As such, the shaded packets indicate the four sampled packets. Because the incoming traffic is dominated by packets that belong to flow #1, all the packets of the sampled traffic belong to flow #1. As such, the sampled traffic does not accurately represent the packets of flows #1, #2, and #3. Instead, the sampled traffic is biased toward the heaviest flow #1.

FIG. 12 depicts an implementation of the adaptive sampling algorithm on the incoming traffic flow of FIG. 10. In this non-limiting example, the output rate (x) of a flow sampling engine is set to 0.25 pps (x=0.25). The global interval is set to the reciprocal of the output rate, which equals 4. The flow interval is set to the total number of flows divided by the output rate, which equals 12. Each incoming packet loops through the adaptive sampling algorithm depicted in FIG. 7 to determine whether the packet should be sampled. Any packet that satisfies either the first or second conditions is sampled until all the packets have been sampled or dropped. The first condition is a "fairness" condition and used to determine whether the latest sample packet is older than the flow interval. The second condition is a "global" condition used to determine whether the latest sample packet is older than the global interval. The global condition is used to prevent underutilization.

TABLE 1 shows the results for evaluating each packet of FIG. 10 in accordance with the adaptive sampling algorithm illustrated in FIG. 7.

| Packet # | Flow # | Satisfies first condition? | Satisfies second condition? | Sample? |
|---|---|---|---|---|
| 1 | 1 | Yes | n/a | Yes |
| 2 | 1 | No | No | No |
| 3 | 1 | No | No | No |
| 4 | 2 | Yes | n/a | Yes |
| 5 | 1 | No | No | No |
| 6 | 1 | No | No | No |
| 7 | 1 | No | No | No |
| 8 | 2 | No | Yes | Yes |
| 9 | 1 | No | No | No |
| 10 | 3 | Yes | n/a | Yes |
| 11 | 2 | No | No | No |
| 12 | 1 | No | No | No |
| 13 | 1 | Yes | n/a | Yes |

The packets #1, #4, #10, and #13 satisfy the first condition. For example, packet #4 is compared against the latest sample packet in the flow interval of 12. The packet #4 is sampled because it belongs to flow #2 and no other packet for flow #2 has been sampled within the flow interval. The packet #8 does not satisfy the first condition but satisfies the second condition because it belongs to flow #2, which was sampled within the flow interval at packet #4. However, the packet #8 satisfies the second condition because the latest sampled packet #4 is before the global interval of 4. Selection of this packet can prevent underutilization.

Thus, the resulting sampled traffic includes two packets from each of flow #1 and flow #2, and a packet from flow #3. This sampled traffic of the adaptive algorithm is more accurate because packets have been sampled from all three flows. In some embodiments, the flow sampling engine can collect aggregate information such as number of packets for each flow. As such, the adaptive sampling algorithm implemented by the flow sampling engine can maintain an output rate of 0.25 pps, which ensures that the flow monitoring system is not overloaded or underutilized with sampled traffic.

Second Example Embodiment

Figures 13, 14, 15:
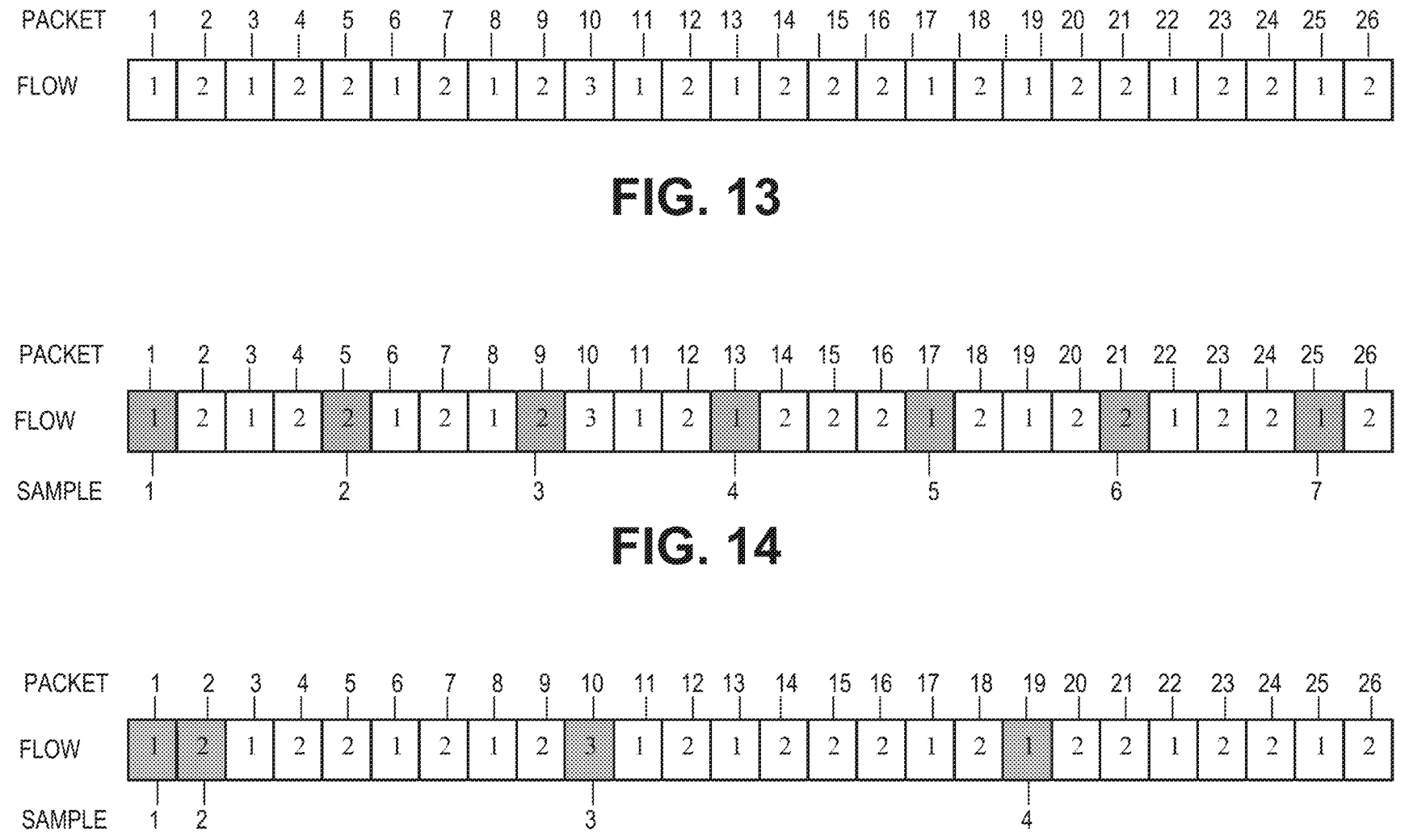

A second example of sampling algorithms implemented by the flow sampling engine is illustrated in FIGS. 13 through 15. In particular, FIG. 13 depicts a second example of an incoming network traffic (from left to right) to the flow sampling engine. The second example implementation has twice the traffic rate (e.g., packets per second) of packets compared to the first example implementation. In particular, the incoming traffic includes twenty-six packets from flows #1, #2, and #3. The incoming traffic includes ten packets from flow #1, fifteen packets from flow #2, and one packet from flow #3. As such, flow #2 is heavier than flow #1, which is heavier than flow #3. If the packet rate is 1 pps, the network traffic would have a duration of 26 seconds. The duration can be 13 seconds, like the first example, if the rate of incoming traffic is 2 pps.

FIG. 14 depicts an implementation of a deterministic sampling algorithm on the incoming traffic flow of FIG. 13. In the illustrated example, a 1-in-N sampling algorithm is implemented by the flow sampling engine, where N=4. As such, the shaded packets indicate seven total sampled packets. Because the incoming traffic is dominated by packets belonging to flow #1 and flow #2, all sampled packets belong to flow #1 and flow #2. In particular, the ratio of incoming traffic for flows #1 through #3 is 10:15:1 yet the flow ratio of the sampled traffic is 4:3:0, respectively. As such, the sampled traffic does not accurately represent the ratio of the incoming traffic. In particular, the sampled traffic does not reflect the lighter flows such as flow #3 in this example. Since N has not changed and the rate of incoming traffic has doubled, the sampled traffic has doubled as well, which might overwhelm a flow monitoring system.

FIG. 15 depicts an implementation of the adaptive sampling algorithm on the incoming traffic flow of FIG. 13. Like FIG. 12, The output rate (x) of the flow sampling engine is set to 0.25 pps (x=0.25). The global interval is set to the reciprocal of the output rate (x), which equals 4. The flow interval is set to the total number of flows divided by the output rate (x), which equals 12. Each packet loops through the adaptive sampling algorithm depicted in FIG. 7 to determine whether the packet should be sampled. Any packet that satisfies either the first or second condition are sampled until all the packets have been sampled or dropped. The first condition is whether the latest sampled flow packet is older than the flow interval, and the second condition is whether the latest sampled global packet is greater than the global interval.

The sampling rate is adapted to the increase in the load of incoming traffic compared to the first example. For example, doubling the packets of the incoming traffic compared to the first example results in one less sampled packet in the second example when implementing the adaptive sampling algorithm. In contrast, doubling the packets of the incoming traffic almost doubles the sampled packets in the second example when implementing the deterministic sampling algorithm, which can overload a flow monitoring system. Thus, the adaptive sampling algorithm can maintain the output rate of sample packets, which will prevent the flow sampling engine from being overloaded. Also, the increase of the load of traffic for flow #2 does not affect the share of samples for other flows, which assures the fairness of the algorithm.

TABLE 2 shows the results for evaluating each packet of FIG. 13 that is processed in accordance with the adaptive sampling algorithm illustrated in FIG. 7.

| Packet # | Flow # | Satisfies first condition? | Satisfies second condition? | Sample |
|---|---|---|---|---|
| 1 | 1 | Yes | n/a | Yes |
| 2 | 2 | Yes | n/a | Yes |
| 3 | 1 | No | No | No |
| 4 | 2 | No | No | No |
| 5 | 2 | No | No | No |
| 6 | 1 | No | No | No |
| 7 | 2 | No | No | No |
| 8 | 1 | No | No | No |
| 9 | 2 | No | No | No |
| 10 | 3 | Yes | n/a | Yes |
| 11 | 1 | No | No | No |
| 12 | 2 | No | No | No |
| 13 | 1 | No | No | No |
| 14 | 2 | No | No | No |
| 15 | 2 | No | No | No |
| 16 | 2 | No | No | No |
| 17 | 1 | No | No | No |
| 18 | 2 | No | No | No |
| 19 | 1 | No | Yes | Yes |
| 20 | 2 | No | No | No |
| 21 | 2 | No | No | No |
| 22 | 1 | No | No | No |
| 23 | 2 | No | No | No |
| 24 | 2 | No | No | No |
| 25 | 1 | No | No | No |
| 26 | 2 | No | No | No |

The packets #1, #4, #10, and #13 satisfy the first condition. For example, packet #4 is compared against the latest sample packet in the flow interval of 12. The packet #4 is sampled because it belongs to flow #2 and no other packet for flow #2 has been sampled within the flow interval. The packet #8 does not satisfy the first condition but does satisfy the second condition because it belongs to flow #2, which has been sampled within the flow interval at packet #4. However, the packet #8 satisfies the second condition because the latest sampled packet #4 is not in the global interval of 4.

Thus, the resulting sampled traffic includes two packets from each of flow #1 and flow #2, and a packet from flow #3. The sampled traffic of the adaptive sampling algorithm is more accurate compared to the sampled traffic of the deterministic sampling algorithm because packets have been sampled from all flows in proportion to the size of each flow. In some embodiments, the flow sampling engine can also collect aggregate information such as number of packets for each flow. As such, the adaptive sampling algorithm implemented by the flow sampling engine can maintain an output rate (x) of 0.25 pps, which ensures that the flow monitoring system is not overloaded or underutilized.

Accordingly, the disclosed embodiments can provide a different sampling rate for different flows, an adaptive sampling rate based on flow size, an adaptive total sampling rate based on traffic load, efficient flow monitoring utilization, and a collection of aggregate information for all flows for an entirety of incoming traffic.

The advantages of the disclosed techniques include the use of a constant output rate by the flow sampling engine to a destination component/device, which can be defined by a user based on the specification of components of the flow sampling engine or the destination component/device to avoid overloading or underutilization. A sampling rate can be adapted to a load of incoming traffic to satisfy the output rate, and the flow sampling engine can implement a sampling rate that is different and variable for each flow and can depend on a pattern and load of incoming traffic, can satisfy conditions for sampling of flows, can be configured to collect information only on a specific range of flow sizes (e.g., selective and intelligent sampling), and can collect aggregate information about every flow (e.g. number of packets received).

Computing System

Figure 16:
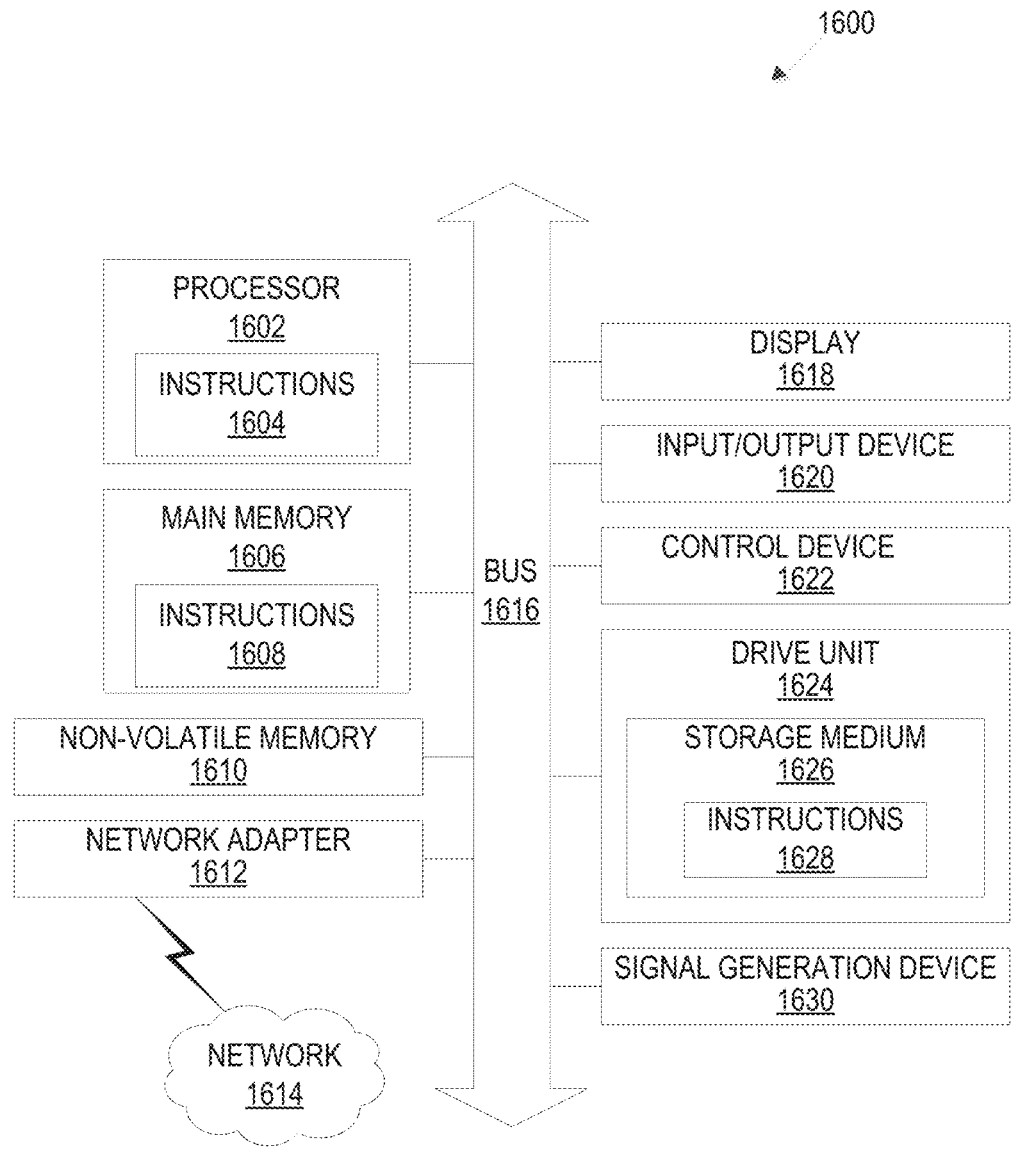
FIG. 16 is a high-level block diagram illustrating an example of a computing system in which at least some operations described herein can be implemented.

FIG. 16 is a block diagram illustrating an example of a computing system 1500 in which at least some operations described herein can be implemented. For example, the computing system 1600 may be responsible for sampling or collecting data related to data flows. The computing system 1600 may include one or more central processing units (e.g., processors 1602), main memory 1606, non-volatile memory 1610, network adapter 1612 (e.g., network interfaces), display 1618, input/output devices 1620, control device 1622 (e.g., keyboard and pointing devices), drive unit 1624 including a storage medium 1626, and signal generation device 1630 that are communicatively connected to a bus 1616.

The bus 1616 is illustrated as an abstraction that represents any one or more separate physical buses, point to point connections, or both connected by appropriate bridges, adapters, or controllers. The bus 1616, therefore, can include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire." A bus may also be responsible for relaying data packets (e.g., via full or half duplex wires) between components of a network device, such as a switching engine, network port(s), tool port(s), etc.

In some embodiments, the computing system 1600 operates as a standalone device, although the computing system 1600 may be connected (e.g., wired or wirelessly) to other machines. For example, the computing system 1600 may include a terminal that is coupled directly to a network device. As another example, the computing system 1600 may be wirelessly coupled to the network device.

In various embodiments, the computing system 1600 may be a server computer, a client computer, a personal computer (PC), a user device, a tablet PC, a laptop computer, a personal digital assistant (PDA), a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, or any machine capable of executing a set of instructions (sequential or otherwise) that specify actions to be taken by the computing system.

While the main memory 1606, non-volatile memory 1610, and storage medium 1626 (also called a "machine-readable medium) are shown to be a single medium, the term "machine-readable medium" and "storage medium" should be taken to include a single medium or multiple media (e.g., a centralized or distributed database, and/or associated caches and servers) that store one or more sets of instructions 1628. The term "machine-readable medium" and "storage medium" shall also be taken to include any medium that is capable of storing, encoding, or carrying a set of instructions for execution by the computing system and that cause the computing system to perform any one or more of the methodologies of the presently disclosed embodiments.

In general, the routines executed to implement the embodiments of the disclosure, may be implemented as part of an operating system or a specific application, component, program, object, module, or sequence of instructions referred to as "computer programs." The computer programs typically comprise one or more instructions (e.g., instructions 1604, 1608, 1628) set at various times in various memory and storage devices in a computer, and that, when read and executed by one or more processing units or processors 1602, cause the computing system 1600 to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include recordable type media such as volatile and non-volatile memory devices 1610, floppy and other removable disks, hard disk drives, optical disks (e.g., Compact Disk Read-Only Memory (CD ROMS), Digital Versatile Disks (DVDs)), and transmission type media such as digital and analog communication links.

The network adapter 1612 enables the computing system 1600 to mediate data in a network 1614 with an entity that is external to the computing system 1600, such as a network device, through any known and/or convenient communications protocol supported by the computing system 1600 and the external entity. The network adapter 1612 can include one or more of a network adaptor card, a wireless network interface card, a router, an access point, a wireless router, a switch, a multilayer switch, a protocol converter, a gateway, a bridge, bridge router, a hub, a digital media receiver, and/or a repeater.

The network adapter 1612 can include a firewall which can, in some embodiments, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including for example, the access and operation rights of an object by an individual, a machine, and/or an application, and the circumstances under which the permission rights stand.

Other network security functions can be performed or included in the functions of the firewall, including intrusion prevention, intrusion detection, next-generation firewall, personal firewall, etc.

As indicated above, the techniques introduced here implemented by, for example, programmable circuitry (e.g., one or more microprocessors), programmed with software and/or firmware, entirely in special-purpose hardwired (i.e., non-programmable) circuitry, or in a combination or such forms. Special-purpose circuitry can be in the form of, for example, one or more application-specific integrated circuits (ASICs), programmable logic devices (PLDs), field-programmable gate arrays (FPGAs), etc.

Note that any of the embodiments described above can be combined with another embodiment, except to the extent that it may be stated otherwise above or to the extent that any such embodiments might be mutually exclusive in function and/or structure.

Although the present invention has been described with reference to specific exemplary embodiments, it will be recognized that the invention is not limited to the embodiments described, but can be practiced with modification and alteration within the spirit and scope of the appended embodiments. Accordingly, the specification and drawings are to be regarded in an illustrative sense rather than a restrictive sense.

The invention claimed is:

1. A method comprising:
receiving, by a network device, a plurality of incoming packets communicated over a computer network;
detecting a flow, of a plurality of flows, to which each packet of the plurality of incoming packets belongs, each incoming packet of the plurality of incoming packets belonging to a flow of the plurality of flows;
sampling each incoming packet that satisfies a flow condition having a flow interval of packets for the flow of the incoming packet, wherein the flow interval is a function of a total number of distinct flows that have any packets in a global interval, divided by an output rate;
sampling each incoming packet that satisfies a global condition having the global interval of packets irrespective of the flow of the incoming packet; and
storing any sampled packets or information indicative of any sampled packets.

2. The method of claim 1, wherein each packet, of the plurality of packets, that satisfies the global condition does not satisfy the flow condition.

3. The method of claim 1, wherein the network device is a first network device, the method further comprising:
outputting any sampled packets to a second network device coupled to the first network device.

4. The method of claim 3 further comprising:
dropping each incoming packet that does not satisfy either of the flow condition and the global condition.

5. The method of claim 1, wherein the plurality of incoming packets originate from a plurality of sources, the method further comprising:
dynamically adapting a sampling rate of the network device to a load of incoming packets to satisfy the output rate.

6. The method of claim 1, wherein the flow condition is satisfied when a flow interval to which an incoming packet belongs does not include any other sampled packet.

7. The method of claim 1, wherein the global interval is a function of the reciprocal of the output rate.

8. The method of claim 7, wherein the global condition is satisfied when a global interval to which an incoming packet belongs does not include any other sampled packet.

9. The method of claim 7, wherein the flow condition is satisfied when a flow interval to which an incoming packet belongs does not include any other sampled packet, and the global condition is satisfied when the flow condition is not satisfied and a global interval to which the incoming packet belongs does not include any other sampled packet.

10. The method of claim 1, wherein each flow is associated with a different sampling rate that depends on a traffic pattern and a load of the incoming traffic to the network device.

11. The method of claim 1 further comprising:
collecting information of each of the plurality of incoming packets; and
aggregating the collected information.

12. The method of claim 11, wherein the collected information is only from flows having a size within a limited range.

13. The method of claim 1, further comprising:
maintaining, by the network device, a flow table including a plurality of entries having information indicative of:
a most recent sampled packet for each flow interval; and
a most recent sampled packet for the global interval such that a sampling rate of each flow is dynamically adjusted as a function of the most recent sampled packet for each flow interval and the most recent sampled packet for the global interval.

14. The method of claim 1, wherein the plurality of incoming packets are received at single ingress port of the network device.

15. The method of claim 1, wherein the network device is an inline network device.

16. The method of claim 1, further comprising, prior to sampling any incoming packet:
setting the output rate of sampled packets to avoid at least one of overloading or underutilization caused by sampling packets.

17. A method comprising:
receiving, by a network device, a plurality of incoming packets of a plurality of flows over a computer network;
setting an output rate of sampled packets for the network device;
for each incoming packet of the plurality of incoming packets:
detecting a flow to which each incoming packet belongs, the flow associated with a flow interval of packets having a number of packets corresponding to a sum of a number of all distinct flows of the plurality of flows in a global interval of packets divided by the output rate, and the global interval of packets has a number of packets that corresponds to an inverse of the output rate;
sampling each incoming packet for a flow when there is no other packet in the flow interval of the incoming packet that has been sampled;
sampling each incoming packet for a flow when there is no other packet in the global interval that has been sampled;
outputting any sampled packet to another network device; and
dropping any incoming packet that has not been sampled.

18. The method of claim 17, wherein the packet is sampled in accordance with the global interval only if the packet was not sampled in accordance with the flow interval.

19. A network device comprising:
an ingress port through which to receive a plurality of packets of a plurality of flows from a plurality of sources over at least one network;
an egress port through which to output each sampled packet of the plurality of packets to another network device in accordance with an output rate;
a processor physically coupled to the ingress port and the egress port and, when in operation, configured to:
sample each packet that satisfies a flow condition having a flow interval of packets of a flow to which the packet belongs, the number of packets in the flow interval corresponding to a sum of a number of all distinct flows of the plurality of flows in a global interval of packets divided by the output rate; and
sample each packet that satisfies a global condition having the global interval of packets corresponding to an inverse of the output rate.

20. The network device of claim 19, wherein a packet is sampled from the global interval only if the packet was not sampled from the flow interval.

21. The network device of claim 19, wherein a global interval of packets includes packets from all the plurality of flows.

22. The method of claim 19, further comprising:
a memory configured store a flow table including a plurality of entries having information indicative of:
a most recent sampled packet for each flow interval; and
a most recent sampled packet for the global interval such that a sampling rate of each flow is dynamically adjusted as a function of the most recent sampled packet for each flow interval and the most recent sampled packet for the global interval.

23. The method of claim 19, wherein the plurality of incoming packets originate from a plurality of sources.

24. The method of claim 19, wherein the network device is further configured to drop each incoming packet that does not satisfy either of the flow condition and the global condition.

25. The method of claim 19, wherein the processor is further configured to dynamically adapt a sampling rate of the network device to a load of incoming packets to satisfy the output rate.

26. A method comprising:
receiving, by a network device, a plurality of incoming packets, each incoming packet of the plurality of incoming packets belonging to a flow of a plurality of flows; and
sampling packets, of the plurality of incoming packets, by the network device, by adapting a sampling rate to dynamically sample packets proportionally across the plurality of flows to avoid random or pseudo-random sampling of flows, wherein the sampling rate is based on a flow interval that is a function of a total number of distinct flows that have any packets in a global interval, divided by an output rate.

* * * * *